United States Patent [19]

Lloyd

[11] Patent Number: 5,024,564
[45] Date of Patent: Jun. 18, 1991

[54] DOWEL DRILLING JIG

[76] Inventor: Larry K. Lloyd, 19708 65th Ave. East, Spanaway, Wash. 98387

[21] Appl. No.: 436,069

[22] Filed: Nov. 13, 1989

[51] Int. Cl.⁵ .......................................... B23B 47/28
[52] U.S. Cl. .............................. 408/115 R; 408/72 P
[58] Field of Search .............. 408/72 B, 72 R, 115 B, 408/115 R, 16, 88, 46, 42, 97, 81, 96, 91, 241 B, 96; 144/144.5, 144.5 GT; 33/562

[56] References Cited

U.S. PATENT DOCUMENTS

| | | | |
|---|---|---|---|
| 2,374,874 | 5/1945 | McKee | 408/88 |
| 2,813,439 | 11/1957 | Gracon | 408/91 |
| 2,836,087 | 5/1958 | Ehresmann | 408/115 |
| 3,033,061 | 5/1962 | Czernec et al. | 408/72 X |
| 4,443,138 | 4/1984 | Butera | 408/115 |
| 4,449,867 | 5/1984 | Dergo | 408/103 |
| 4,594,032 | 6/1986 | Warburg | 408/115 |
| 4,602,898 | 7/1986 | Brown et al. | 408/115 |
| 4,752,162 | 7/1988 | Groh | 408/115 |

Primary Examiner—Larry I. Schwartz
Assistant Examiner—Robert Schultz
Attorney, Agent, or Firm—Glenn D. Bellamy

[57] ABSTRACT

Disclosed is a doweling jig which allows a workpiece to be positioned on the top surface of a platform to guide the drilling of corresponding holes into the workpiece at preselected locations. The workpiece-supporting platform includes a pair of side edges and a guideway which extends along the edges. A plurality of drill guides, each of which includes a guide opening, is removably engageable with the guideway to be positionable at preselected locations along either of the side edges. The workpiece may be positioned on the platform and against the drill guides for the drilling of holes in the workpiece through the guide opening in each drill guide. The jig may be configured to allow for simultaneous drilling of holes in two or three adjacent surfaces of the workpiece.

14 Claims, 5 Drawing Sheets

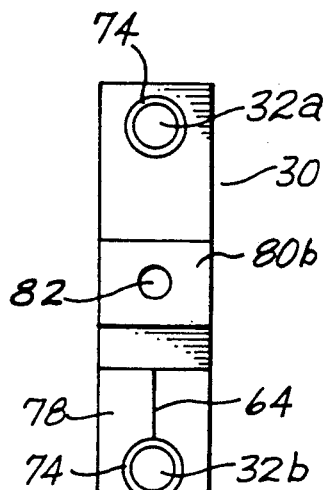
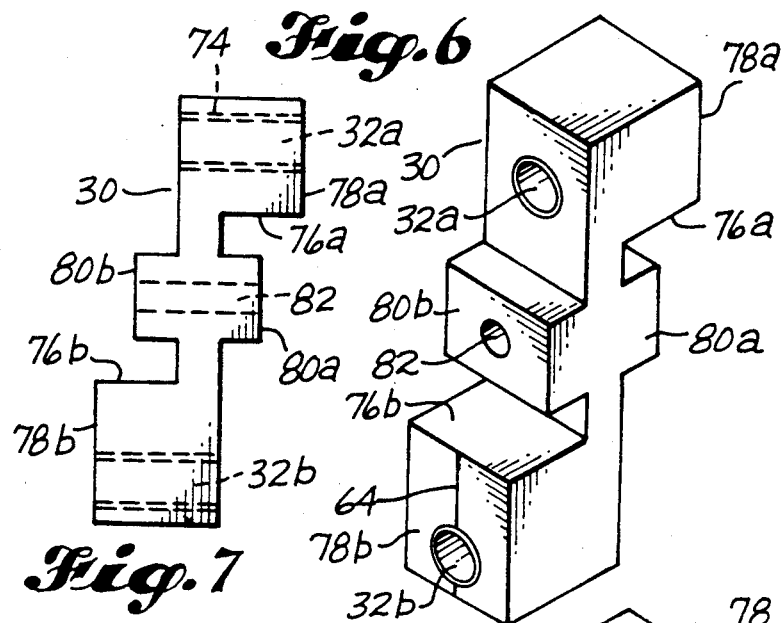
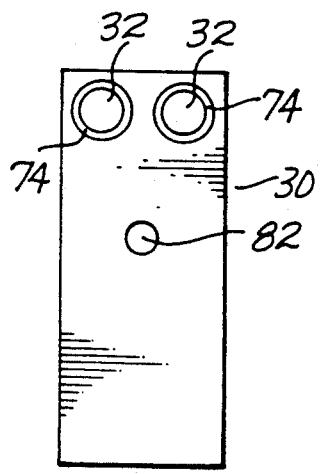
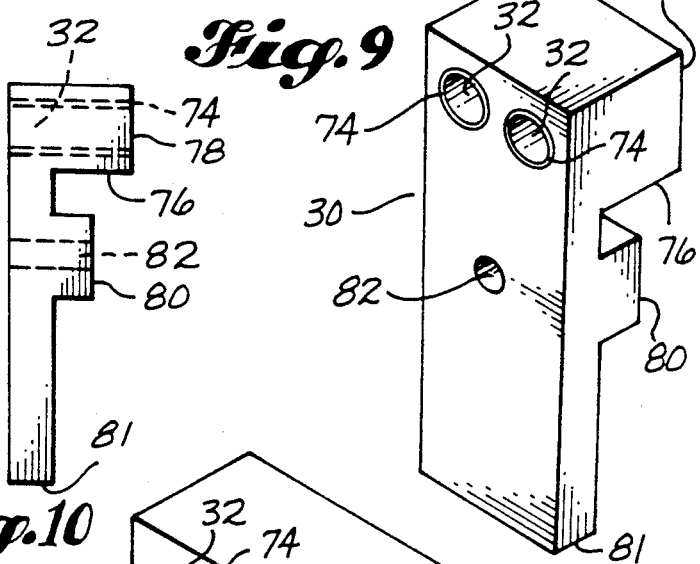
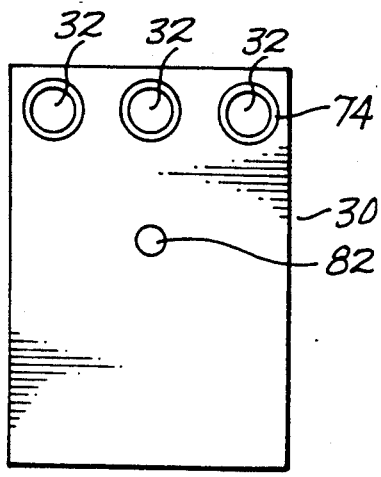
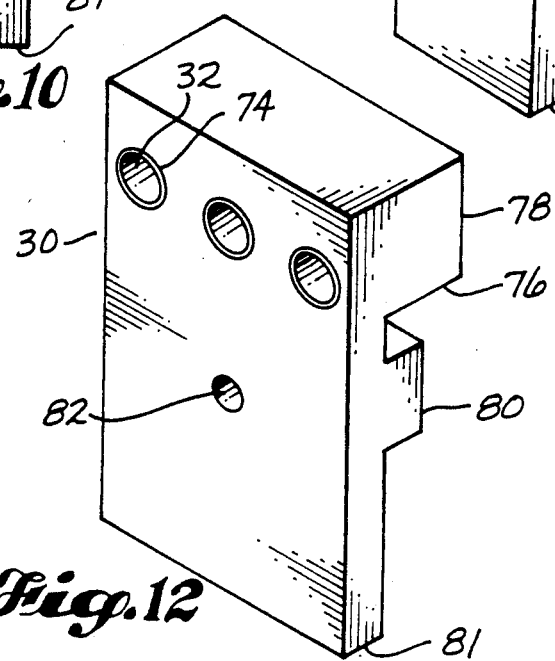

DOWEL DRILLING JIG

DESCRIPTION

1. Technical Field

This invention relates to a drill-guiding jig for forming corresponding, dowel-receiving holes in workpieces. In particular, this invention provides a dowel jig especially suited for cabinet making and with which multiple drill guides are positionable along edges of a workpiece-supporting platform.

2. Background Art

In the construction of wooden furniture and cabinetry, workpieces are often joined together using the commonly-known dowel joint. A dowel joint is formed by drilling corresponding holes into the face, edge or end of each workpiece. The corresponding holes then receive a dowel that extends between the two workpieces. This type of connection creates a very strong and accurately-aligned joint.

Clamp-on drill guides are available and are intended to perform two critical functions. First, the drill guide positions the drill to form a hole at a chosen location on the surface of the workpiece to correspond with a location on the adjoining workpiece. The second function is to accurately guide the drill into the workpiece to form a hole which is precisely perpendicular to the surface of the workpiece.

Various kinds of dowel drill fixtures, or jigs, are known in the art. For example, U.S. Pat. Nos. 4,443,138; 4,594,032; and 4,602,898 each show doweling jigs which clamp onto the edge of a workpiece to permit the drilling of corresponding dowel holes therein. U.S. Pat. No. 4,449,867 shows an adjustable angle dowel jig onto which a workpiece may be clamped for drilling a hole or set of holes and then moved for subsequently drilling a second hole or set of holes. U.S. Pat. No. 4,752,162 shows a drilling jig with a pair of adjustably spaced-apart drill guides for forming dowel pin holes along one edge or side of a workpiece.

Each of these drilling jigs, however, require that they be repositioned relative to the workpiece for the drilling of each hole or set of holes. This type of arrangement is very inconvenient and can multiply any error in placement as the jig is moved along the edge of the workpiece for separate drillings. Also, there is no gained efficiency or assurance of uniformity when multiple copies of identical workpieces are being made.

SUMMARY OF THE INVENTION

The present invention provides a doweling jig which guides the drilling of corresponding holes into a workpiece at preselected locations. The jig includes a workpiece-supporting platform having a top surface and a pair of side edges. A guideway extends along each of the side edges and a plurality of drill guides, each including a guide opening, are removably engageable with the guideway. The drill guides are positionable at preselected locations along either of the side edges. A workpiece may be positioned on the platform and against the drill guides for drilling of holes into the workpiece through a guide opening in each of the drill guides.

This jig allows a workpiece to be drilled with a series of dowel-receiving holes along one or more surfaces without repositioning the workpiece relative to the jig. Likewise, multiple copies of identical workpieces may be made without disturbing the configuration and spacing of the jig's drilling guides, therefore increasing efficiency of production and assuring uniformity. The preset placement of drill guides along the platform edge eliminates the need for marking the workpiece and then attempting to center a drilling guide on the marked surface. In a two-sided or L-shaped configuration, the jig allows a workpiece to be simultaneously aligned for drilling of two adjacent surfaces. Also, a pair of miter-cut workpieces may conveniently be positioned for oblique drilling. In a three-sided or U-shaped configuration, the jig allows reversal of workpieces for creating mirror-image drilled workpieces or allows simultaneous alignment for drilling of three workpiece surfaces (such as opposite ends and one edge) of a standard length workpiece.

Drill guides having single or multiple guide openings are provided which interfit with the side edge guideway or channel. A lock means holds each drill guide firmly in position during use and allows it to be slidably moved for reconfiguration and adjustment of the jig.

Other important aspects and features of this invention will become apparent by examination of the accompanying drawings, detailed description of the best-known mode for carrying out the invention, and appended claims.

BRIEF DESCRIPTION OF THE DRAWINGS

Like reference numerals refer to like parts throughout the various figures of the drawing, wherein:

FIG. 6 shows a pictorial view of a reversible drill guide;

FIGS. 7 and 8 are side and front views, respectively, of the drill guide shown in FIG. 6;

FIGS. 9, 10 and 11 show a typical two-hole drill guide; and

FIGS. 12 and 13 show a typical three-hole drill guide.

BEST MODE FOR CARRYING OUT THE INVENTION

Figure 1:
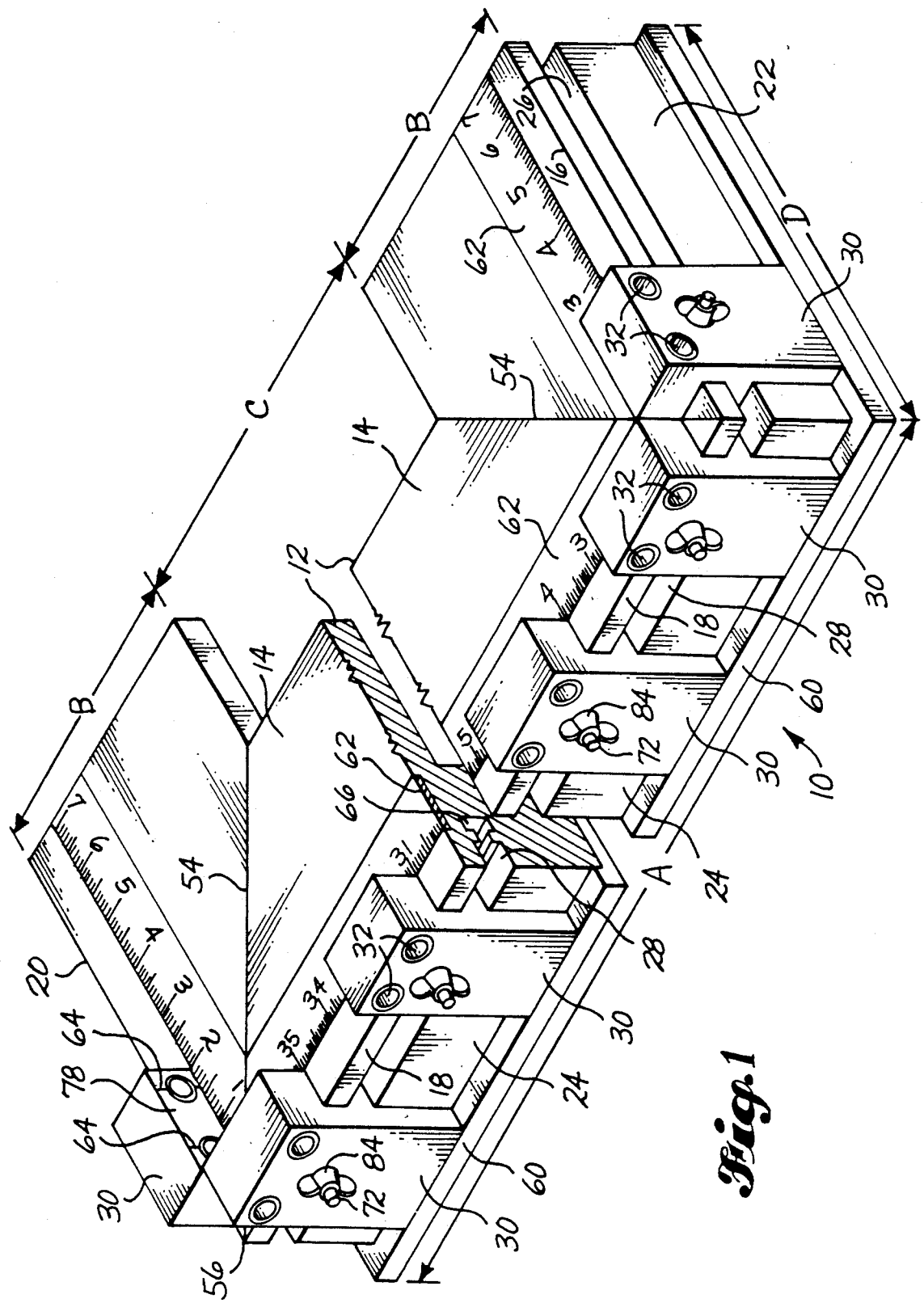
FIG. 1 is a fragmentary pictorial view of the preferred embodiment of the invention in a U-shaped configuration.

This invention was described in a previously-filed Disclosure Document No. 219,700, entitled "Cabinet Frame Dowel Jig," and filed Feb. 10, 1989. Retention of this Disclosure Document by the U.S. Patent Office has been separately requested. Referring now to the various figures of the drawing, and first to FIG. 1, therein is shown at 10 a three-sided or U-shaped dowel-drilling jig according to the preferred embodiment of the invention. The jig 10 includes a workpiece-supporting platform 12 having a top surface 14 and side edges 16, 18, 20. Adjacent side edges 16/18, 18/20 are preferably perpendicular to each other and opposite edges 16, 20 are parallel. The platform 12 may be made of any dimensionally stable material such as aluminum or structural plastics. Downwardly extending from each side edge 16, 18, 20 is a side panel 22, 24 which includes a channel-shaped guideway 26, 28 adjacent the side edge 16, 18, 20. Adjustable drill guides 30 may be positioned along any of the side edges 16, 18, 20 and are slidably guided and retained by the guideway 26, 28. Each drill guide 30 includes one or more guide openings 32 which are positioned to be a preselected distance above the top surface 14 of the platform 12 and are sized to receive drill bits of a preselected diameter. Details of the drill guides' construction will be discussed further below.

Figure 2:
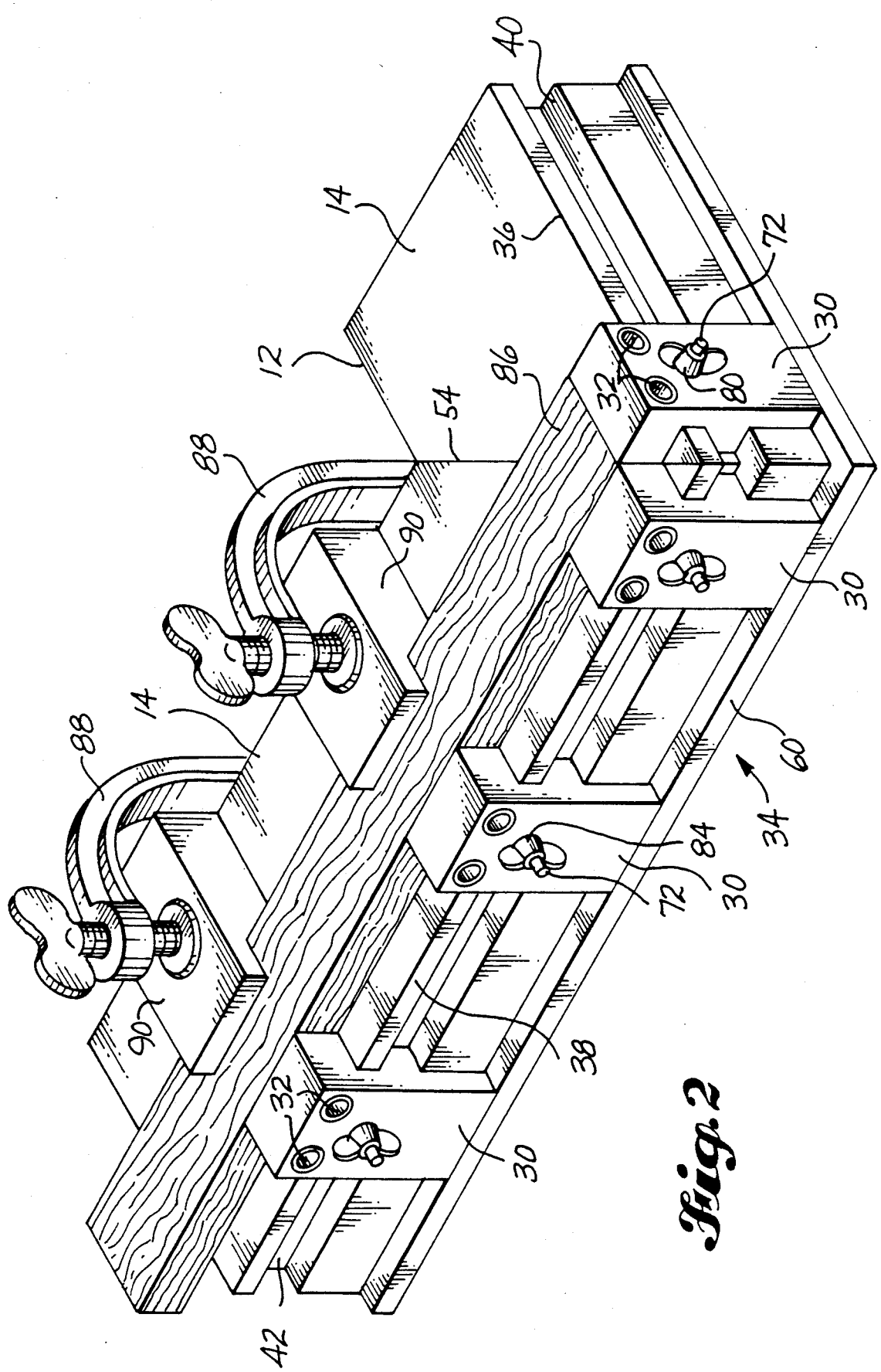
FIG. 2 is a pictorial view of the preferred embodiment of the invention in an L-shape configuration and showing a workpiece clamped thereon for edge and end drilling.

Referring now to FIG. 2, therein is shown at 34 a two-sided or L-shaped dowel-drilling jig according to the preferred embodiment of the invention. This embodiment also includes a workpiece-supporting platform 12 having a top surface 14 and a pair of perpendicular side edges 36, 38. A guideway 40, 42 extends adjacent to and along substantially the entire length of each edge 36, 38. Adjustable drill guides 30 are positionable along either of the side edges 36, 38.

Figure 4:
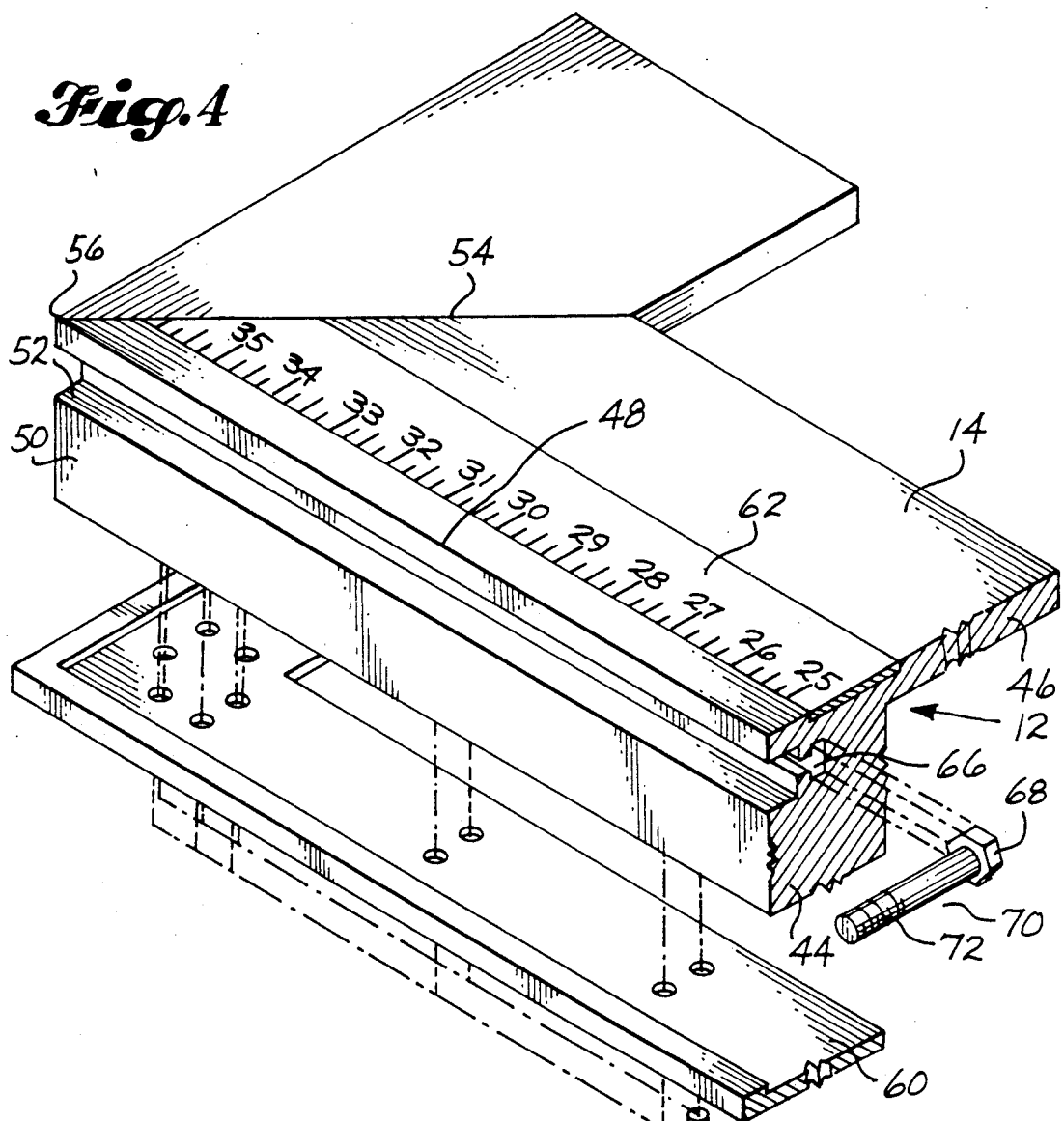
FIG. 4 shows an exploded fragmentary pictorial view of the workpiece platform and its base.

As shown in FIG. 4, the platform 12 may include a base portion 44 and a horizontally-extending platform 46. The base portion 44 has a side 50 which extends downwardly from a side edge 48 of the platform's top surface 14. The side 50 includes a guideway 52 formed along the length of the platform 12 adjacent the side edge 48. The platform 12 may be formed from mulitple pieces of an extruded, molded, or milled shape which are then joined together by a miter joint 54. In preferred form, the miter joint 54 joins the pieces of the platform 12 together to form a right angle. However, if desired, the corner 56 angle may be made to any preselected angle as required for the particular use of the jig. In order to provide rigidity and to maintain the position of the platform pieces, the entire platform 12 is attached, as by screws or bolts 58, to a frame 60 which is formed from a single piece of stock. The frame 60 should also be made from a dimensionally stable material such as aluminum or structural plastic.

Co-extensive with each guideway 26, 28, 40, 42, 52 is a dovetail-like retention groove 66. Referring to FIG. 4, the retention groove 66 has a constricted opening and an enlarged inner portion which is sized to receive the head portion 68 of a drill guide attachment bolt 70. The head portion 68 of the bolt 70 is preferably of a non-round shape and is closely received by the retention groove 66 to prevent rotation of the bolt 70, but to allow the bolt 70 to be slid along the groove 66. A threaded shank 72 of the bolt 70 extends outwardly through the constricted opening and beyond the guideway channel 52. A separate bolt 70 is provided for each drill guide 30 to be used with the jig and each bolt 70 is slidable along the length of the retention groove 66 and guideway 52 which extend substantially the entire length of the side edge 48.

Referring now to FIGS. 8-12, therein are shown various configurations of drill guides 30 according to the preferred embodiment of the invention. FIGS. 9, 10 and 11 show a typical drill guide 30 having a pair of guide openings 32. The drill guide 30 is made of a dimensionally stable material such as aluminum or structural plastic. Each drill guide opening 32 includes a sleeve 74 having an inner bore sized to receive and guide a drill bit of a preselected diameter. The sleeve 74 is constructed of a wear-resistant and dimensionally stable material such as steel. The drill guide openings 32 are spaced apart a predetermined distance according to that preferred for the selected dowel diameter and thickness of the workpiece to be drilled. Likewise, the drill guide openings 32 are positioned to guide a drill bit into a workpiece a predetermined distance above the top surface 14 of the platform 12. This is accomplished by spacing of the guide opening 32 the predetermined distance above the chin surface 76 of the guide 30. The chin surface 76 is that which lies directly against the upper surface 14 of the platform 12 when the drill guide 30 is positioned on the jig 10. The face surface 78 of the drill guide 30 is that which is positioned to directly contact the workpiece.

Spaced downwardly below the drill guide openings 32 and outwardly extending from the drill guide 30 is a guideway engagement portion 80. This portion 80 is sized to snugly interfit and be received by the guideway 26, 28, 40, 42, 52 formed along any edge 16, 18, 20, 36, 38, 48 of the platform 12. The engagement of this portion 80 in the guideway channel holds the chin surface 76 firmly against the top surface 14 of the platform 12 and prevents upward or rotational movement of the drill guide 30 when it is in position on the jig 10. A further downwardly extending foot portion 8 is sized to bear against the base 44 of the platform 12 and to rest against the bottom flange 66. In this manner, the drill guide 30 is further braced against displacement from the platform 12.

Figure 3:
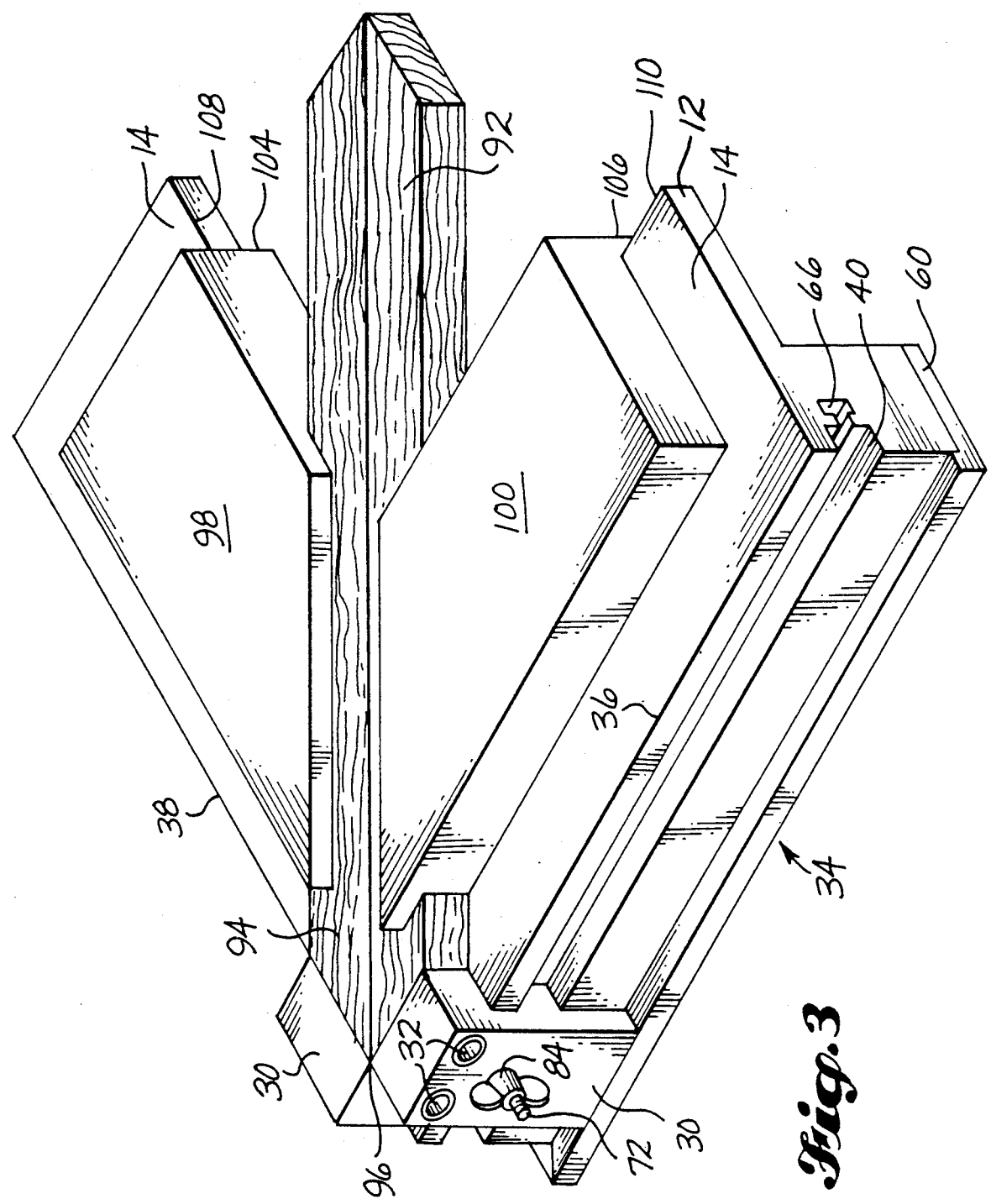
FIG. 3 shows a pictorial view of the dowel jig with a pair of miter-cut workpieces positioned for oblique end drilling.

An opening 82 extends through the drill guide 30 substantially parallel to and below the guide openings 32. The opening 82 is sized to receive the threaded shank 72 of an attachment bolt 70. In preferred form, this opening 82 also extends through the guideway engagement portion 80, as described above. Referring again to FIG. 4, the dovetail retention groove 66 into which the head 68 of the attachment bolt 70 is slidaby mounted, extends along the guideway channel 52. Although the illustrated embodiment is preferred, the retention groove 66 could be placed at a different location on the side surface 50 of the base 44. In such case, the opening 82 in the drill guide 30 would be similarly relocated. As shown in FIGS. 1, 2 and 3, each drill guide 30 may be securely positioned along an edge 16, 18, 20, 36, 38 of the platform 12 and clamped firmly in place by a wing nut 84 threaded onto the shaft 72 of the attachment bolt 70. In this manner, the wing nut 84 may be slightly loosened by the user to laterally adjust the position of each drill guide 30 and then be firmly clamped into position by tightening of the wing nut 84. Although many equivalent ways of firmly positioning the drill guides 30 may be used, the illustrated construction is preferred.

The drill guide 30 shown in FIGS. 12 and 13 is identical in all respects to that previously described except that it includes a set of three guide openings 32 laterally spaced apart at preselected intervals. Similarly, drill guides 30 having single or mulitple guide openings 32 may be provided in accordance with the expected use of the jig 10. Separate drill guides 30 are provided for producing dowel holes of different diameters, spacing and/or placement.

FIGS. 6, 7 and 8 show a drill guide 30 according to an alternate embodiment. This alternate embodiment includes at least a pair of drill guide openings 32a, 32b which are positioned at opposite ends of the drill guide 30 for independent use. This drill guide 30 is provided with separate face 78, chin 76, and guideway-engaging portions 80a, 80b which are positioned to function independently and without conflicting with the function of each other. A drill guide 30 made according to this alternate embodiment may be reversible between single and mulitple guide openings 32, or reversible between guide openings 32a, 32b of different diameters or distances above the chin surface 76a, 76b. A scale 62 may be printed on, or preferably, inlaid into the top surface 14 of the platform 12. The scale 62 is calibrated to indicate (as in inches or millimeters) the distance from a reference point, such as from side edge 16. Such measuring indicia may be included along some or all of the side edges 16, 18, 20. The scale 62 is also positioned on the top surface 14 such that indicia 64 provided on the drill guides indicating the centerline of guide openings 32 will correspond with calibration markings on the scale 62. In this manner, the drill guides 30 may be positioned along edges of the platform 12 at preselected positions without the necessity of using a separate measuring instrument and without pre-marking the workpiece.

Referring now again to FIGS. 1 and 2, in operation, drill guides 30 are positioned securely at preselected locations along an edge or edges 16, 18, 20, 36, 38 of the platform 12. The drill guides 30 are selected to include guide openings 32 having an internal bore corresponding with the diameter of the drill to be used and dowel hole to be formed. Also, the drill guides 30 are selected to have the guide openings 32 positioned at the proper distance above the top surface 14 of the platform 12 and to have proper separation from one another (when drill guides 30 having multiple guide openings 32 are used). A workpiece 86 is positioned face down on the top surface 14 of the platform 12 and against the face surface 78 of each drill guide 30. The workpiece 86 may then be clamped securely in position on the platform 12 for drilling. This may be accomplished by the use of ordinary C-clamps 88. In order to accommodate relatively narrow workpieces 86, such as that illustrated in FIG. 2, clamp blocks 90 which include a notch dimensioned to receive a workpiece 86 of a selected thickness are used in conjunction with the C-clamps 88. The relatively thin construction of the platform extension portion 46 allows a lower arm of an ordinary C-clamp 88 to extend thereunder for convenient clamping.

A two-sided or L-shaped jig 34, as shown in FIG. 2, may be used for simultaneously positioning a workpiece 86 for drilling of dowel holes in two separate surfaces, such as a side edge and end, as shown. Normally, the intersection between side edges 36, 38 is at a right angle. However, a jig 34 could be constructed at other angles to meet the particular needs of the user.

A three-sided or U-shaped jig 10, as shown in FIG. 1, may be used for simultaneously positioning a workpiece for drilling of dowel holes in up to three separate surfaces, such as a side edge and opposite ends. Typically, the overall size of the jig 10 will be dimensioned to accept workpieces of the size expected to be commonly encountered by the user. According to a preferred embodiment of the U-shaped jig 10 designed for use in construction of residential kitchen and bathroom cabinetry, the overall length of the jig 10 (represented by dimension A) is 38½ inches. The depth of each platform top surface 14 (represented by dimension B) is 5 inches. This would cause dimension C to be approximately 27¾ inches, thereby allowing the jig 10 to accept a workpiece of at least 36 inches in length. When it is necessary to drill workpieces of a longer length, a portion of the workpiece may be allowed to overhang the end of the platform 12, as shown in FIG. 2. This may also be accomplished on the three-sided embodiment 10 by moving either of the end drill guides 30 to one side or by removing it completely. The length of side extensions of the platform 12 (represented by dimension D) may be varied as desired, but preferably should be at least 7 inches.

In order to achieve optimal results from this jig 10, 34, it is important to always place the face or working edge of the workpiece 86 downwardly against the top surface 14 of the platform 12. In this manner, if slight variations in thickness exist between workpieces to be joined together, any offset will occur on the back or unexposed side.

Figure 5:
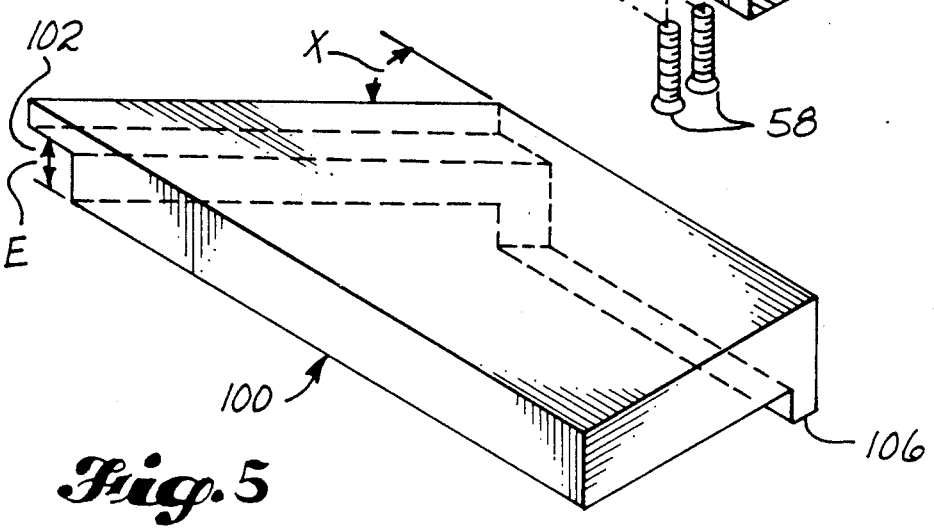
FIG. 5 shows a pictorial view of a hold-down block for miter-cut workpieces as shown in FIG. 3.

Referring now to FIG. 3, therein is shown a two-sided jig 34 configured for use in making oblique angle dowel-receiving holes in miter-cut workpieces 92, 94. One or more drill guides 30 is positioned a preselected distance from the corner 96 in order to guide the drilling of dowel holes into the mitered end of each workpiece 92, 94. An identical arrangement of one or more drill guides 30 is set up along each edge 36, 38. In this manner, workpieces 92, 94 which are so positioned and drilled will mate precisely when positioned with a dowel extending between corresponding holes. Again, it is important that the face of each workpiece 92, 94 be placed downwardly against the top surface 14 of the platform 12. In order to firmly position the miter-out workpieces 92, 94 for oblique end drilling, specially-shaped clamp blocks 98, 100 are used in conjunction with ordinary C-clamps (not shown). The structure of one such clamp block 100 is shown in detail in FIG. 5. The clamp block 100 includes a workpiece-receiving notch having a height E corresponding to the thickness of the workpiece to be clamped. This notch 102 is formed along an angled end of the clamp block 100 which is formed at an angle X corresponding to the angle at which the workpiece is cut. Typically, this would be a 45 degree angle such that the joined, finished workpieces will create a right angle. However, workpieces out at other angles could be drilled, if desired, with simple modification. Each clamp block 98, 100 includes a downwardly-extending lip portion 104, 106 which is shaped to bear against outer edges 108, 110 of the platform 12. In this manner, the workpieces 92, 94 are securely clamped at precisely the proper angle for drilling. If drilling of a single miter-cut workpiece is desired, it is suggested that a similarly-cut scrap piece be clamped adjacent the workpiece in order to assure precise alignment.

The above-described and illustrated embodiments are for purposes of example only. Many modifications may be made in the size, construction, or configuration of the illustrated embodiments without departing from the spirit and scope of the invention. Therefore, these embodiments are not intended to be limitive and my patent protection is not to be defined by them, but rather by the following claim or claims as construed in accordance with accepted doctrines of claim interpretation, including the doctrine of equivalents.

What is claimed is:
1. A dowel jig for positioning a workpiece to guide the drilling of corresponding holes therein at preselected locations, said jig comprising:
   a workpiece-supporting platform having a top surface and a pair of adjacent side edges extending substantially transverse each other and substantially transverse said top surface, said side edges of said platform being positioned for alignment with separate noncoplanar surfaces to be drilled on said workpiece;

a guideway extending along and adjacent to each of said side edges and being positioned entirely relatively below said top surface; and a plurality of drill guides each including a guide opening and adapted to be removably engaged with said guideway and positionable at preselected locations along a selected one of either of said side edges and not engaging the nonselected side edge, each said drill guide including a portion which projects relatively upwardly beyond said top surface, said guide opening being positioned in said upwardly projecting portion, wherein said workpiece may be positioned on said top surface and against said drill guides for drilling of holes in said workpiece substantially parallel to said top surface through a guide opening in each said drill guide.

2. The dowel jig of claim 1, wherein said side edges are perpendicular to one another.

3. The dowel jig of claim 2, wherein a separate drill guide is located at each of said side edges and wherein said workpiece may be positioned against each of said drill guides to be simultaneously aligned for drilling of holes on separate surfaces of said workpiece, each of said separate surfaces being positioned in a separate plane.

4. The dowel jig of claim 1, wherein a separate drill guide is located at each of said side edges and wherein said workpiece may be positioned against each of said drill guides to be simultaneously aligned for drilling of holes on separate surfaces of said workpiece, each of said separate surfaces being positioned in a separate plane.

5. The dowel jig of claim 1, wherein said platform includes a third side edge adjacent one of said pair of side edges, and wherein said guideway extends along said third side edge.

6. The dowel jig of claim 5, wherein each said side edge is perpendicular to an adjacent one of said side edges and parallel to an opposite one of said side edges.

7. The dowel jig of claim 1, wherein said platform includes a side downwardly extending from said top surface at each of said side edges, and said guideway including a channel formed along each said side adjacent its respective side edge, each said drill guide including a portion dimensioned to engage said channel and including a locking means for releasably positioning each said drill guide along either of said side edges.

8. The dowel jig of claim 7, wherein said platform includes indicia on said top surface indicating measured intervals along a side edge.

9. The dowel jig of claim 1, wherein said platform includes indicia on said top surface indicating measured intervals along a side edge.

10. The dowel jig of claim 9, wherein each said drill guide includes indicia alignable with said top surface indicia for indicating the spacing of said drill guides at preselected measured intervals.

11. The dowel jig of claim 1, wherein each one of said drill guides includes a plurality of guide openings, said guide openings spaced apart a preselected distance from one another.

12. The dowel jig of claim 11, wherein said platform includes indicia on said top surface indicating measured intervals along a side edge and each said drill guide includes indicia alignable with said top surface indicia for indicating the spacing of said drill guides at preselected measured intervals.

13. The dowel jig of claim 1, wherein said platform includes a restraining means for firmly holding a positioned workpiece on said platform in alignment with said drill guides.

14. The dowel jig of claim 1, wherein at least one of said drill guides includes a pair of separate guide openings, each guide opening having a separate preselected size, and wherein said drill guide is reversibly positionable along a said side edge for use of a separate one of said guide openings at a time.

* * * * *